United States Patent [19]

Hammad

[11] 4,016,371
[45] Apr. 5, 1977

[54] FREQUENCY TONE DETECTION

[75] Inventor: Mohamad Hammad, Santa Ana, Calif.

[73] Assignee: Rockwell International Corporation, El Segundo, Calif.

[22] Filed: Jan. 26, 1976

[21] Appl. No.: 652,596

[52] U.S. Cl. .......................... 179/84 VF; 324/78 D
[51] Int. Cl.² ........................................ H04M 1/50
[58] Field of Search ............. 179/84 VF; 324/78 D; 328/138

[56] References Cited

UNITED STATES PATENTS

| | | | |
|---|---|---|---|
| 3,537,001 | 10/1970 | Friend | 179/84 VF |
| 3,573,633 | 4/1971 | Marrero | 324/78 D |
| 3,790,720 | 2/1974 | Schartmann | 179/84 VF |
| 3,801,906 | 4/1974 | Harris | 324/78 D |
| 3,949,177 | 4/1976 | Ball | 179/84 VF |

*Primary Examiner*—Kathleen Claffy
*Assistant Examiner*—Joseph A. Popek
*Attorney, Agent, or Firm*—Robert J. Crawford; Howard R. Greenberg

[57] ABSTRACT

The detection of frequency tones, such as used in telephone pushbutton dialing to identify the digits of a called number, is performed in a digital manner which affords both speed and reliability of detection, by repetitively measuring the frequency of a frequency tone so that each measured frequency can be assigned to one of a plurality of valid frequency bands, maintaining a count thereof for the individual frequency bands, and assigning the frequency tone to the first frequency band to achieve a predetermined count level.

14 Claims, 1 Drawing Figure

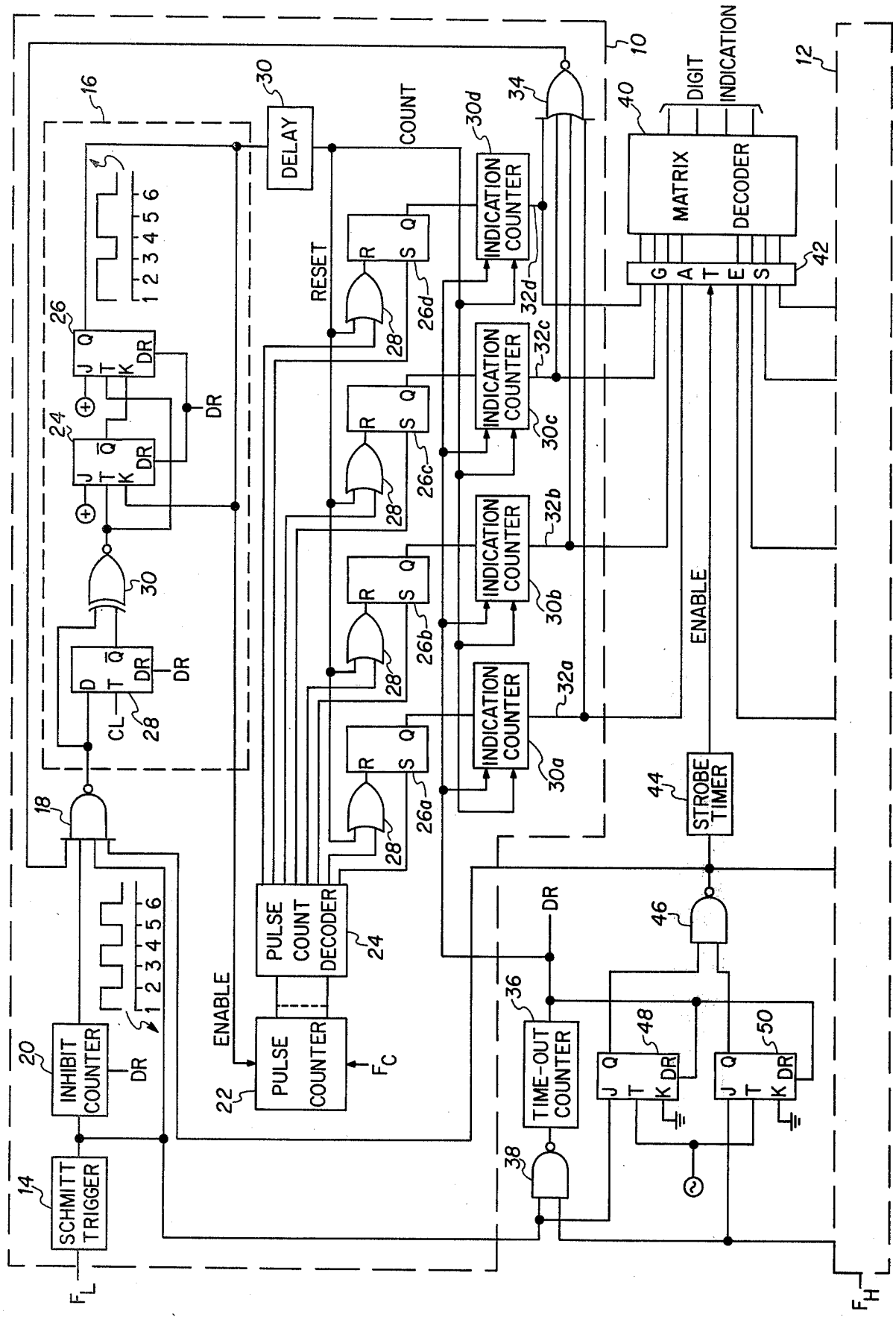

FREQUENCY TONE DETECTION

BACKGROUND OF THE INVENTION

The subject invention pertains to frequency detection of periodic signals in general and specifically to a digital technique especially suited for use with frequency tones such as used in connection with telephone pushbutton dialing.

The rapid supplantation of the venerable telephone rotary dial which generates dial pulses to indicate the digits of a called telephone number with the modern pushbutton keyboard which generates frequency tones to perform the same function has stimulated great interest in the frequency detection equipment required at the telephone switching exchange to detect and identify the transmitted frequency tones. As is well known, in the latter scheme each digit is represented by a unique pair of frequency tones, one selected from a low frequency group normally comprised of four different frequencies and the other selected from a high frequency group normally comprised of either three or four different frequencies. Since the actual frequency of each received tone is affected by the vagaries of the tone generator equipment in the telephone set itself and more importantly the telephone system linking the telephone set with the telephone switching equipment, it cannot be presumed that the received tones will have precise frequencies in accordance with established standards. This problem is obviated by establishing frequency bands providing frequency tolerance ranges into which the two frequencies which identify each digit must fall to be considered valid and the digit accepted.

At the inception of pushbutton dialing, the natural inclination was to perform the frequency detection function for identifying called digits, including establishing the frequency bands, with analog equipment such as LC filters. However, the benefits of reduced fabrication costs and equipment size made possible by the dramatically expanding digital technology field did not escape those involved with frequency tone detectors and so digital designs have been developed. These designs, however, do not appear to totally resolve two antithetical objectives in the detection process, namely, speed (the frequency tone is guaranteed to be present for a duration of only 40 milliseconds when the calling party merely taps the pushbutton of his telephone set as would normally be done) and reliability (assuring that only valid frequency tones are accepted and are not spurious noise or worse, "talk-off," which engenders audio signals which are sent by the telephone transmitter from the calling party who may happen to be speaking while also dialing and which are a particular problem since the frequencies employed for the frequency tones fall into the audible range). These former designs have been found to be either too exacting, in which case, good signals are rejected along with the bad thereby requiring telephone customers to be put to the inconvenience of redialing or, to the other extreme, too undemanding so that too many bad signals are accepted along with the good resulting in misconnections.

With the foregoing in mind, it is a primary object of the present invention to provide a new and improved means for detecting and identifying the frequency of frequency tones such as employed in telephone pushbutton dialing.

It is a further object of the present invention to provide such a new and improved detection means which balances the need for speed and reliability in the detection process.

It is still a further object of the present invention to provide such a new and improved detection means employing counting techniques of simple design so as to lend itself easily to digital implementation. The foregoing objects, as well as others, and the means by which they are achieved through the present invention may best be appreciated by referring to the Detailed Description of the Preferred Embodiment which follows hereinafter together with the single drawing which is a combined block and schematic diagram depicting the invention.

BRIEF DESCRIPTION OF THE INVENTION

In accordance with the stated objects, the invention herein employs digital counting techniques to identify which frequency band a frequency tone falls into as well as to ensure the reliability of the detection process before the frequency is accepted as being valid. Specifically, the frequency of the tone is determined by counting the number of clock pulses of a known frequency which are generated during a counting interval, on a repetitive basis, that is a function of at least one cycle of the tone signal (and therefore its period which is inversely proportional to the frequency and consequently a measure thereof as established by the pulse count). Each frequency band has associated therewith a counter whose count is incremented each time that the frequency determined in a counting interval falls within its associated frequency band. A frequency is accepted as being valid only when its associated counter achieves a predetermined count, thus assuring that the frequency was detected in a successive number of periodic cycles of the frequency tone equal to the predetermined count. The magnitude of the predetermined count is selected to insure that a valid frequency will be detected in the time allotted for the presence of the frequency tone which is 40 milliseconds in the case of the telephone system. To inject further reliability into the detection process, up/down counters can be used, in which case the counters associated with the frequency bands not containing the frequency detected in a counting interval are decremented following that interval. Using the same level of predetermined count alluded to earlier, it will be readily seen that decrementing in combination with incrementing the counters imposes a more stringent condition on accepting a frequency as being valid since spurious signals outside the valid frequency band will decrement its count thereby interfering with its ability to achieve that predetermined count. Despite this greater stringency, it will be seen that sufficient time is still afforded to achieve a valid frequency indication.

The reliability of the detection technique employed in the invention herein is further enhanced by including means for ignoring a predetermined number of cycles at the inception of a frequency tone so as to permit signal stability to be established before actual counting begins. Furthermore, a strobe timer is employed in order to limit the amount of time allowed for identifying the frequencies of a pair of valid frequency tones once their presence is initially detected so as to minimize the effects of spurious signals. A timeout counter is also included to cause all information to be released if either of the two frequency tones is absent for more than a predetermined period before detection is completed.

DETAILED DESCRIPTION OF THE PREFERRED EMBODIMENT

When used in telephone switching equipment for detecting the two frequencies of a tone pair which define a digit in a called number, the invention could be embodied as shown in the accompanying drawing, with detailed low frequency detector block 10 performing the function of determining into which one of the low frequency bands (it being assumed herein only for purposes of illustration that there are four valid low frequency bands) the low frequency tone $F_L$ falls and high frequency detector block 12 which duplicates the components of block 10 (and is therefore not detailed) for determining into which one of the high frequency bands (likewise assumed to be four in number) $F_H$ falls. Although not shown, it should be readily apparent that the composite signal comprising $F_L$ and $F_H$ has already been filtered and other appropriate signal processing such as limiting performed to render those individual tones $F_L$ and $F_H$ available for application to their respective frequency detectors 10 and 12. The low and high frequencies, $F_L$ and $F_H$, respectively, are detected in the same manner, each being applied first to a squaring circuit such as Schmitt Trigger 14 to provide well defined 50% duty cycle positive pulses (the logic shown being designed to operate on positive pulses) on which to perform the frequency detection. The output of Schmitt Trigger 14 is applied to a counting interval control circuit 16 via two inputs of a NAND gate 18, one being direct and the other through an inhibit counter 20. Prior to the reception of a frequency tone, all counters, including inhibit counter 20, are directly reset by a signal DR so that counting is always initiated from a predetermined level. Inhibit counter 20, which may be realized with any well known counter, is programmed to generate a high level (1) logic signal at its output for enabling NAND gate 18 to pass the output of Schmitt Trigger 14 only after having counted any desired number of initial cycles in the frequency tone $F_L$ so that any transients at the beginning of the frequency tone have time to dissipate before the actual frequency detection is performed. At this time the other two inputs to NAND gate 18, which will be explained in due course, are 1's so that NAND gate 18 applies to the counting interval control circuit 16 the inverse of the output signal produced by Schmitt Trigger 14.

The counting interval control circuit 16 establishes repetitive counting intervals, whose durations are based on the period of individual cycles of the frequency tone $F_L$, in which clock pulses of a known frequency $F_C$ are counted by a pulse counter 22 which likewise may be any well known type of counter to determine the frequency of the tone $F_L$. Since frequency is inversely proportional to the period of a cycle and the number of clock pulses $F_C$ which can be generated in a counting interval whose duration is based on a cyclical period is directly proportional thereto, the number of clock pulses counted during an interval is inversely proportional to the frequency and consequently a measure thereof. Like counts in successive counting intervals indicate a constant frequency while unlike counts signify a false or degraded frequency tone signal. A bi-level signal is used to control the operation of pulses counter 22 with a 1 enabling the counter 22 to count the pulses $F_C$ applied thereto and a 0 providing the dual function of resetting pulse counter 22 to the same initial state and inhibiting its counting. Although the invention is compatible with any periodic counting interval desired, counting intervals coincident with individual cycles of the frequency tone $F_L$ and separated by half-cycles of the frequency tone $F_L$ have been found to be convenient as well as affording a sufficient number of counting intervals within the allotted time of 40 milliseconds in which the telephone system frequency tone is guaranteed to be present for achieving the desired reliability. This is accomplished with two J-K flip-flops 24 and 26 operated in conjunction with a dual one-shot multi-vibrator consisting of a D-type flip-flop 28 whose D input receives the output of NAND gate 18 and exclusive NOR gate 30 whose output is applied to the toggle (T) inputs of both flip-flops 24 and 26. Applying clock pulses CL, having a frequency much greater than that of the frequency tone $F_L$ to the T input of D flip-flop 28, it will be seen that the two inputs to exclusive NOR gate 30, one being derived from the output of NAND gate 18 directly and the other from the Q output of D flip-flop 28, will cause the output of NOR gate 30 to always be high (both inputs different) except for the brief moment until the next clock pulse CL following a level change at the D input of flip-flop 28 occurs to change its Q output. During this brief moment the two inputs to NOR gate 30 are the same and consequently the output of gate 30 is low. Thus, each transition in the level of the frequency tone $F_L$ as reflected at the output of Schmitt Trigger 14, whether positive or negative going, produces a negative toggling pulse at the output of NOR gate 30 which is applied to both T inputs of flip-flops 24 and 26 for toggling them. With both J inputs of flip-flop 24 and 26 connected to a high level signal source and the Q output of flip-flop 26 fed back to the K input of flip-flop 24, it will be readily seen that beginning with a reset condition for both flip-flops (both Q outputs high and Q outputs low), the first toggling pulse produced at the output of exclusive NOR gate 30 sets both flip-flops 24 and 26, the second toggling pulse resets flip-flop 24, but not flip-flop 26, and the third toggling pulse resets flip-flop 26 while flip-flop 24 just remains in the reset state. The foregoing sequence is repeated beginning with the fourth toggling pulse output from NOR gate 30. Thus, the Q output of flip-flop 26 remains high to provide an enable signal to pulse counter 22 during a period from one toggle pulse to the next alternate toggle pulse while providing a low signal to disable pulse counter 22 during a period from that next alternate clock pulse to the next consecutive clock pulse on a repetitive basis. Since the toggle pulses occur coincident with the transition edges of the frequency tone $F_L$, it will be readily seen that the enable period provided between alternate toggle pulses is coincident with a full cycle of the frequency tone while the disable period between consecutive clock pulses is coincident with a half-cycle of the frequency tone which is illustrated by the pulse waveforms shown in the drawing at the Schmitt Trigger 14 and the flip-flop 26 Q outputs. Since the lowest nominal frequency for telephone frequency tones is 697 Hz corresponding to a maximum period of approximately 1.4 milliseconds, the guaranteed 40 milliseconds duration for a frequency tone allows about 20 individual frequency measurement counting intervals (accounting for 0.7 milliseconds in between counting intervals) to be used over the full allotted time, if desired.

As already mentioned, since frequency is inversely proportional to period, the number of clock pulses $F_C$ counted during a counting interval is indicative of the frequency being measured with the higher the count achieved by pulse counter 22 in a counting interval, indicating a lower corresponding frequency. Once $F_C$ is established ($F_C$ should be much greater than the highest frequency expected to be detected to optimize resolution, 447 and 223 kHz having been found efficacious for the high and low frequency groups, respectively), the various counts corresponding to the various frequencies can be monitored by a pulse count decoder 24 to produce an output indicative of the frequency detected. As alluded to earlier, under Background of the Invention, the vagaries of signal generation and transmission necessitates the employment of frequency bands rather than a single frequency for detecting the presence of a valid frequency. Thus, each band has an upper and lower frequency providing a range therebetween of frequencies which will be considered valid if the frequency tone falls within the band. One well known method of establishing the frequency bands (see U.S. Pat. No. 3,537,001) employs a plurality of R-S flip-flops 26 (a–d) as band indicators, there being one for each frequency band. The set (S) input of each flip-flop 26 is connected to a different one of the outputs of decoder 24 while the reset (R) input of each flip-flop 26 is likewise connected to a different one of the outputs of decoder 24 via the first input of an individual OR gate 28. A second input to each OR gate 28 is connected to the Q output of flip-flop 26, preferably through a delay circuit 30 which will be explained shortly. Bearing in mind that a progressively higher count for pulse counter 22 denotes a progressively lower frequency, the state of each flip-flop 26 can be used to identify when its frequency band is entered and exited by the count in pulse counter 22 during the counting interval by connecting its S lead to the decoder 24 output corresponding to the upper frequency of the band and the first input of its associated OR gate 28 to the decoder 24 output corresponding to the lower frequency of the band. Thus, during the counting phase when the upper frequency of a valid frequency band is traversed to enter the band, its associated flip-flop 26 is set, while the same flip-flop 26 is reset when the lower frequency is traversed when passing out of the band. If a valid frequency has been detected at the end of a counting interval, then one and only one flip-flop 26 associated therewith will remain set. At the end of each counting interval, after the information has been transferred into storage, the set flip-flop 26 is reset to await the next counting interval by the low Q output of flip-flop 26 via the second input to OR gate 28. The preferred delay circuit 30 assures that all clock pulses $F_C$ are properly accounted for at the end of each counting interval prior to resetting flip-flops 26 which could prove critical when the detected frequency $F_L$ is right at the border of a valid frequency band.

Each flip-flop 26 has associated therewith an indication counter 30 (a–d) which increments its count at the end of each counting interval when its associated flip-flop 26 is set as indicated by the Q output applied thereto. As shown in the drawing, the count function can be triggered with the same signal as used to reset the flip-flops 26. Since one and only one flip-flop 26 can be set at the end of each counting interval, only one of the indication counters 30 will be incremented with the other three remaining unchanged. Since the certainty that a detected frequency is in fact a valid frequency is heightened by the greater number of counting interval detections made for that frequency, as indicated by the states of flip-flops 26, the count achieved by the individual indication counters 30 can be used to insure that a minimum number of like frequency detections were made before that frequency is accepted as being valid. Thus, each counter 30 is programmed to produce a high level signal at its output 32 (a–d) when its count achieves some predetermined level.

If greater reliability is desired, the foregoing counting technique can be sophisticated by decrementing the count of each indication counter 30 at the end of each counting interval when the detected frequency does not lie within its associated frequency band. Assuming that the predetermined counting level which must be achieved by the indication counters 30 before a frequency is accepted as being valid remains the same as before decrementing imposes a more stringent condition on the acceptance of a valid frequency since it makes it more difficult for the predetermined count level to be attained. This more sophisticated approach can be used with readily available up/down counters whose counting direction is controlled by a bi-level signal applied thereto. Thus, in the accompanying drawing a high level signal at the Q output of flip-flops 26 would constitute a count-up command while a low level signal would constitute a count-down command at the time a count signal is generated. If, for some reason, no valid frequency was detected during a particular counting interval, all four flip-flops 26 (a–d) would be in the reset state at the end thereof and all four associated indication counters would be decremented rather than just three in the normal case where the detected frequency lay in one of the valid frequency bands. This more sophisticated aproach was found to work quite well using a predetermined count level of seven for the indication counters 30. The outputs 32 of the indication counters 30 are connected as inputs to a NOR gate 34 whose output is applied as another input to NAND gate 18. Thus, as soon as any one of the indication counters 30 registers an output upon achieving the predetermined count level, NAND gate 18 is disabled by the output of NOR gate 34 from passing the frequency tone $F_L$, thereby terminating frequency detection.

The reliability of the detector may be further enhanced by a time-out counter 36 which is reset to the same initial state and begins counting any time that the output of a NAND gate 38 produces a low level signal. Since the inputs of NAND gate 38 are connected to receive the $F_L$ and $F_H$ waveforms reproduced at the outputs of the Schmitt Trigger circuits 14, the time-out counting period will be initiated any time that either signal (as represented by high level pulses) is not present. At the end of the time-out period, 10 milliseconds having been found to be a suitable period, the time-out counter 36 produces the direct set (DR) signal previously alluded to for resetting the necessary counters and flip-flops in the detectors 10 and 12. The time-out counter 36 assures that an interruption in either the high or low frequency tone greater than the time-out period prior to acceptance of a valid digit results in a rejection of all the stored information to that point, based on the premise that the information to that point is not reliable. Furthermore, this provides the means for preparing the detectors 10 and 12 during the period intermediate dialed digits to receive new information contained in the next pair of frequency tones received.

The outputs of the indication counters 30 in both detectors 10 and 12 are applied to a matrix decoder 40 via gates 42 which are enabled to pass the information by the output of a strobe timer 44. The matrix decoder 40 may be designed to provide an output indication of the digit corresponding to the two detected frequencies, $F_L$ and $F_H$, either in a binary code or by energizing an individual lead associated with each individual digit. The strobe timer 44 is controlled by the output of a NAND gate 46 whose two inputs are connected to the Q outputs of two flip-flips 48 and 50 which are clocked from a high frequency source. The J inputs of flip-flops 48 and 50 are connected, respectively, to the $F_L$ and $F_H$ outputs reproduced by their respective Schmitt Trigger circuits 14, while both K inputs are connected to ground. Consequently, as soon as both flip-flops 48 and 50 are triggered into the set state upon the first positive pulse occurring in their respective frequency waveforms, NAND gate 46 produces a low level signal to initiate and lock up the operation of strobe timer 44. The output of NAND gate 46 is also applied as an input to NAND gate 18 to enable it to pass $F_L$ and $F_H$ only after both $F_L$ and $F_H$ have been received. Strobe timer 44 serves to provide any desired window for limiting the passage of the detected frequency information in detectors 10 and 12 to the telephone switching equipment via gates 42 and matrix decoder 40. In actual operation, the strobe window was set for 22 milliseconds to 38 milliseconds, thereby precluding a digit indication from being generated and transmitted to the switching equipment before the passage of 22 milliseconds after the inception of both a high and low frequency tone and not after 38 milliseconds from that inception, thus requiring that both frequency detectors 10 and 12 register valid frequencies within the 38 milliseconds lest the information not be accepted. This minimizes the possibility of decoding an invalid digit resulting from spurious signals such as noise and talk-off.

Thus, it is seen that the invention herein affords a digital design for detecting frequency tones which is simple, yet reliable and realizable with readily available commercial digital components whether they be discreet or of the integrated circuit type. Since the preferred embodiment lends itself to modifications by those skilled in the art which might still very well engender the scope and spirit of the invention, the foregoing Detailed Description is intended to be merely exemplary and not circumscriptive of the invention which will now be claimed hereinbelow.

What is claimed is:

1. A frequency detector for determining which one of a plurality of frequency bands, each consisting of at least one valid frequency, contains the frequency of a frequency tone signal, comprising:
   a source of clock pulses having a known frequency which is greater than that of the highest possible valid frequency;
   pulse counting means for counting the number of clock pulses generated during a counting interval on a repetitive basis, the duration of each counting interval being a function of at least one cycle of the frequency tone signal, and
   indication counting means for maintaining a count for each of the frequency bands of the number of counting intervals that said pulse counting means has attained a value corresponding to a valid frequency therein and generating an output signal indicative of the first frequency band to have its associated count achieve a predetermined level.

2. The frequency detector of claim 1 wherein said indication counting means includes means for decrementing the count for each of the frequency bands after each counting interval except the one whose associated frequency band contains the frequency to which the pulse count in that counting interval corresponds.

3. The frequency detector of claim 1 wherein said indication means comprises a plurality of frequency band indicators and a plurality of indication counters, there being one band indicator and one indication counter associated with each other for each frequency band, with said band indicators connected to the output of said pulse counting means for providing an indication of the frequency band into which a frequency corresponding to a pulse count falls during the time between the end of the counting interval for that pulse count and the next counting interval and said indication counters count the number of individual indications produced by their respective band indicators to individually provide said output signal upon achieving said predetermined count level.

4. The frequency detector of claim 1 wherein each counting interval has a duration equal to the periodic cycle of which it is a function and consecutive counting intervals are separated by one-half cycle of the frequency tone signal.

5. The frequency detector of claim 1 including means for inhibiting said pulse counting means during a predetermined number of initial cycles of the frequency tone signal.

6. The frequency detector of claim 1 including time-out means for resetting all counts of said indication counting means to their initial states as existed at the inception of the frequency tone signal should a signal absence be detected for longer than a predetermined time period.

7. The frequency detector of claim 1 including means for inhibiting said pulse counting means upon the generation of said output signal.

8. A method for determining which one of a plurality of frequency bands, each consisting of at least one valid frequency, the frequency of a frequency tone signal falls into, comprising:
   generating a series of clock pulses having a known frequency which is greater than that of the highest possible valid frequency;
   counting the number of clock pulses generated during a counting interval on a repetitive basis, the duration of each counting interval being a function of at least one cycle of the frequency tone signal;
   counting for each of the frequency bands the number of counting intervals in which a value corresponding to a frequency therein is attained, and
   generating an output signal indication of the first frequency band to register a predetermined number of counting intervals in which one of its valid frequencies was detected.

9. The method of claim 8 including decrementing the count for each of the frequency bands after each counting interval except the one whose associated frequency band contains the frequency to which the pulse count in that counting interval corresponds.

10. The method of claim 8 wherein each counting interval has a duration equal to the periodic cycle of which it is a function and consecutive counting intervals are separated by one-half cycle of the frequency tone signal.

11. A frequency detector for determining which one of a group of high frequency bands and a group of low frequency bands, each band consisting of at least one valid frequency, contains the frequency of a high and low frequency tone signal, respectively, comprising:
   a source of clock pulses having a known frequency which is greater than that of the highest possible valid frequency;
   a pair of pulse counting means, one for each of the frequency groups for counting the number of clock pulses generated during a counting interval on a repetitive basis, the duration of each counting interval being a function of at least one cycle of its respective frequency tone signal, and
   a pair of indication counting means, one for each of the frequency groups, for maintaining a count for each of the frequency bands within its group of the number of counting intervals that its associated pulse counting means has attained a value corresponding to a valid frequency therein and generating an output signal indicative of the first frequency band to have its associated count achieve a predetermined level.

12. The frequency detector of claim 11 wherein each of said indication counting means includes means for decrementing the count for each of the frequency bands in its associated group after each counting interval except that one whose associated frequency band contains the frequency to which the pulse count in that counting interval corresponds.

13. The frequency detector of claim 11 including decoding means responsive to the output signals from said pair of indication counting means for providing a signal indicative of the high and low frequency tones they represent, there being a different signal indication for each one of the possible combinations of high and low frequency tones.

14. The frequency detector of claim 13 including strobe timer means for enabling said decoding means to be responsive to said output signals only for a predetermined time period following detection of the presence of both a high and low frequency tone signal.

* * * * *

UNITED STATES PATENT OFFICE
CERTIFICATE OF CORRECTION

PATENT NO. : 4,016,371
DATED : April 5, 1977
INVENTOR(S) : Mohamad Hammad

It is certified that error appears in the above–identified patent and that said Letters Patent are hereby corrected as shown below:

IN THE SPECIFICATION

Column 4, line 23, delete "Q" and substitute therefor --$\bar{Q}$--;

line 27, delete "Q" and substitute therefor --$\bar{Q}$--;

and line 40, delete "Q" and substitute therefor --$\bar{Q}$--;

Column 6, line 22, after "before" insert a --,(comma)--.

Signed and Sealed this

Fourteenth Day of June 1977

[SEAL]

*Attest:*

RUTH C. MASON
*Attesting Officer*

C. MARSHALL DANN
*Commissioner of Patents and Trademarks*